(12) United States Patent
Bertocchi (10) Patent No.: US 9,161,561 B2
(45) Date of Patent: Oct. 20, 2015

(54) METHOD AND APPARATUS FOR EXTRACTING PUREE OR JUICE FROM A VEGETABLE OR ANIMAL FOOD

(76) Inventor: Alessandro Bertocchi, Parma (IT)

( * ) Notice: Subject to any disclaimer, the term of this patent is extended or adjusted under 35 U.S.C. 154(b) by 163 days.

(21) Appl. No.: 13/131,405

(22) PCT Filed: Dec. 18, 2009

(86) PCT No.: PCT/IB2009/007812
§ 371 (c)(1),
(2), (4) Date: Jun. 10, 2011

(87) PCT Pub. No.: WO2010/070437
PCT Pub. Date: Jun. 24, 2010

(65) Prior Publication Data
US 2011/0244101 A1 Oct. 6, 2011

(30) Foreign Application Priority Data
Dec. 18, 2008 (IT) .............. PI2008A0131

(51) Int. Cl.
| | | |
|---|---|---|
| *B26D 1/00* | (2006.01) |
| *B02C 15/00* | (2006.01) |
| *B04B 5/10* | (2006.01) |
| *A23L 1/10* | (2006.01) |
| *A23L 1/216* | (2006.01) |
| *A23L 1/212* | (2006.01) |
| *A23L 2/04* | (2006.01) |
| *A23L 2/06* | (2006.01) |
| *A23N 1/02* | (2006.01) |

(52) U.S. Cl.
CPC .............. *A23L 1/2128* (2013.01); *A23L 2/04* (2013.01); *A23L 2/06* (2013.01); *A23N 1/02* (2013.01)

(58) Field of Classification Search
CPC ... A23L 1/2113; A23L 1/2118; A23L 1/2128; A23L 2/02; A23L 2/04; A23L 2/06; A47J 9/00; A47J 9/027; A23N 1/00; A23N 1/003; A23N 1/02

USPC ........... 426/481; 99/511, 483, 484, 501, 503, 99/510
See application file for complete search history.

(56) References Cited

U.S. PATENT DOCUMENTS 3,873,753 A * 3/1975 Nelson et al. ............... 426/615
5,993,876 A 11/1999 Bertocchi

FOREIGN PATENT DOCUMENTS

| CA | 837535 A * | 3/1970 |
| EP | 0457062 | 11/1991 |
| EP | 0888718 | 1/1999 |
| WO | WO 03024243 A2 * | 3/2003 |
| WO | 03034843 | 5/2003 |

* cited by examiner

*Primary Examiner* — Michele L Jacobson
*Assistant Examiner* — Tynesha McClain-Coleman
(74) *Attorney, Agent, or Firm* — Ladas & Parry LLP (57) ABSTRACT

Method for extracting puree, or juice, from a starting product based on vegetable or animal food comprising a starting treatment step, for example a step of softening the food product obtaining a treated product (101). A deviation step follows (102), during which the treated product is selectively directed towards a cold extraction (110), or towards a hot extraction (200). If the treated product is directed towards a cold extraction, it follows firstly an extraction step (103), in which the treated product at the inlet is separated into a main product comprising the puree, or the juice (103*a*) and into a waste material (103*b*). The main product is then subjected to an enzymatic inactivation step which provides quickly heating the treated product up to a determined temperature T (104). In case, instead, the treated product is directed towards a hot extraction, it follows firstly the enzymatic inactivation step (203), and then it follows the extraction step, from which the main product (204*a*) and the waste material (204*b*) derive.

13 Claims, 5 Drawing Sheets

Fig. 5

METHOD AND APPARATUS FOR EXTRACTING PUREE OR JUICE FROM A VEGETABLE OR ANIMAL FOOD

FIELD OF THE INVENTION

The present invention relates to the food industry and, in particular, it relates to a method for extracting juice and puree from vegetable or animal food.

Furthermore, the invention relates to an apparatus that carries out this method.

DESCRIPTION OF THE PRIOR ART

As well known, a variety exists of types of rotating machines (milling and finishing machines) for extracting juice or puree mainly from vegetable food, fruit and vegetables, but also from animal food, meat and fish.

Normally, the product to treat is previously softened or chopped more or less finely in a first step for being then put in an extractor in a second step, in which it can also be heated. The extraction machines of prior art are essentially made up of a fixed structure that comprises a rotary drum sieve of cylindrical or conical shape, so-called sieve, and by a rotor with blades that rotates inside. The rotor is mounted on a shaft and is caused to rotate quickly by a motor. In particular, a chopped or softened food product is continuously pushed radially by centrifugal force against the sieve. This way, it is filtered through the holes of the sieve, producing a liquid part (juice) and/or a solid but homogeneous part (puree), which are conveyed away and collected for being then subject to further treatments. The solid parts that do not pass through the sieve, instead, are brought away axially opposite to the inlet and are automatically conveyed to an unloading station (waste material). See for example IT1199392.

A known method of this kind is the extraction at room temperature (also-called "cold extraction") that is carried out in two steps: a first step of cutting and/or softening the food pulps through a plurality of pulses in quick succession (see IT1249363) and a second step of separation in the extractor of the useful fractions (juice and puree) from the waste solid parts. The puree extracted at room temperature is, then, heated, usually very quickly by an enzymatic inactivation system, for blocking the enzymatic activity and stabilizing it. The final product that can be obtained with this method has a taste that is very similar to the original fruit or vegetable, is fresh and has a bright colour.

Another known method of this kind is the hot extraction, or traditional method. In particular, the hot extraction provides milling the vegetables, or the fruit, heating them up to a enzymatic inactivation temperature, then extracting the puree using one, or more extraction machines. The final product exiting from this method has a traditional taste of cooked food and a darker colour.

Obviously, in either methods, other intermediate steps can be included, such as a cold or a hot de-aeration step, a further finishing step, etc.

The production factories have often the need of making production campaigns both of the one type of "more cooked" product and of the other type of "fresher" product.

The producers who wish to use a same apparatus to make, in two separate the production campaigns, both a "more cooked" product and a "fresher" product, need a plant comprising at least two extraction machines, in order to use the first extraction machine as chopper of the input food product, thus avoiding to purchase a further chopper, and the second extraction machine, normally used as fine extractor, to actually extract juice and puree from the chopped and heated food product.

However, this solution has various drawbacks.

Firstly, said method can be operated only in plants having at least two extraction machines. In case of a plant with a single extraction machine, i.e. in most cases, the other extraction machine is missing, i.e. that which acts as chopper.

Furthermore, the plant of enzymatic inactivation and all the systems of pumps and ducts is studied for a homogeneous puree. Therefore, for carrying out a "hot" extraction, in a same plant where the plant of enzymatic inactivation is adapted to treat a homogeneous puree, a chopped product with seeds, peels, peduncles etc. has to be treated, with a risk of jamming the tubes and the valves, as well as of wrong operations by the measurement instruments, in particular the flow rate sensors, etc.

In EP0457062, WO03/034843 and EP0850572 examples are described of methods in which the vegetable food is subject firstly to a cold extraction and then is sent to a plant of enzymatic inactivation.

In EP0888718, instead, a method is described in which the vegetable food is firstly sent to a plant of enzymatic inactivation and then to an extractor, or a centrifugal machine, for a hot extraction.

SUMMARY OF THE INVENTION

It is therefore a feature of the present invention to provide a method for extracting juice and puree from vegetable or animal food in order to use a single extraction machine both for cold and for hot extraction.

These and other objects are achieved by an apparatus according to the invention, for extracting puree, or juice, from vegetable food, comprising:

- a treatment section, for treating said vegetable food and obtaining a treated product;
- an extraction section in which a rotor is arranged that is adapted to work in combination with a fixed sieve that has a plurality of holes, in order to separate a main product comprising said puree, or juice, which passes through said sieve and is discharged via a first outlet, from a waste material which cannot pass through said sieve and is discharged via a second outlet;
- an enzymatic inactivation section comprising a heating means that is adapted to heat a product from an initial temperature up to an inactivation temperature and maintaining said inactivation temperature for a determined time;

whose main feature is that, furthermore, a selection means is provided for selectively directing the treated product exiting from said treatment section either firstly into said enzymatic inactivation section and secondly into said extraction section, or firstly into said extraction section and secondly into said enzymatic inactivation section.

Advantageously, said selection means comprises a deviation device that is associated to said treatment section for alternatively directing the treated product along a first discharge direction, or along a second discharge direction.

In particular, the extraction section is arranged along said first discharge direction, whereas the enzymatic inactivation section is arranged along said second discharge direction. More in detail, when the treated product is directed along the first discharge direction, it enters extraction section from where the main product is sent to the plant of enzymatic inactivation; instead, when the treated product is directed towards the second discharge direction, it crosses the enzymatic inactivation section and from there the heated product is then fed into the extraction section.

In particular, the treatment section can be selected from the group comprised of:
a softening section;
a grinding section;
a shredding section;
a sieving section;
a cutting section;
or a combination thereof.

Advantageously, the deviation device of the treatment section and the enzymatic inactivation section are connected to each other by a first transfer means that is adapted to collect the treated product from the treatment section and to transfer it towards the enzymatic inactivation section.

In particular, downstream of the enzymatic inactivation section a first deviation valve can be provided which is adapted to direct selectively the heated product along a station for collection of the final cold-extracted product, or towards the extraction section.

Advantageously, downstream of the extraction section a second deviation valve is provided for selectively directing the main product towards a station for collection of the final hot-extracted product or towards the enzymatic inactivation section.

Furthermore, a program means can be provided that is adapted to adjust the product heating speed in the enzymatic inactivation section. In particular, if the product is sent first in the extraction section and then in the enzymatic inactivation section, i.e. in case of "cold extraction" the program means sets a higher heating speed v1, whereas if the product is sent first in the enzymatic inactivation section and then in the extraction section, i.e. in case of "hot extraction", the program means sets a lower heating speed v2. In fact, in case of a cold extraction the product has to be heated for a very short time, to avoid cooking the food product, whereas in case of a hot extraction the product has to be heated for a longer time. It is intended that heating speed has the meaning of either a higher heating power, or a longer heating time of the product under a same power.

More in detail, the enzymatic inactivation section can comprise:
a means for adjusting the thermal power transferred to the product;
a means for adjusting the volume of the treated product;
wherein a program means control the means for adjusting the thermal power and the means for adjusting the volume of the treated product in order to have a predetermined heating speed.

More precisely, in case a quick heating of the product has to be achieved, the program means sets a high thermal power P1 and at the same time a high volume V1 of the treated product. This way, the treated product is brought quickly to the enzymatic inactivation temperature. Instead, in case a slower heating of the product has to be achieved, the program means sets a thermal power P2 less than P1 and at the same time sets a volume of the treated product V2 less than V1.

According to another aspect of the invention, a method for extracting puree, or juice, from a food product of vegetable or animal origin, comprises the steps of:
treating said vegetable or animal food, obtaining a treated product;
separating said product of vegetable or animal origin into a main product comprising said puree, or juice, and into a waste material, said separation being made through a rotor that works in combination with a fixed sieve that has a plurality of holes, said main product passing through said holes and being discharged via a first outlet, said waste material passing not, instead, through said sieve and being discharged via a second outlet;
inactivating a starting product, said enzymatic inactivation being made by heating means that heats said starting product from an initial temperature up to an inactivation temperature and maintaining said inactivation temperature for a determined time;
and comprises the further steps of selecting a direction of said treated product, among a first selection in which said treated product is directed firstly towards said enzymatic inactivation step and secondly towards said separation step, said starting product being coincident in this case with said treated product and said separation being a hot extraction, or a second selection in which said treated product is directed firstly towards said extraction step and secondly towards said enzymatic inactivation step, said starting product being coincident in this case with said main product and said separation being a cold extraction.

In particular, the step of selecting a direction is effected by a selection means that is arranged downstream of said treating step.

In particular, the treating step can be selected from the group comprised of:
a softening step;
a grinding step;
a shredding step;
a sieving step;
a cutting step;
or a combination thereof.

Advantageously, during the enzymatic inactivation step the starting product is heated at a determined heating speed, and comprises the further steps of adjusting the heating speed.

In particular, if the product is sent firstly to the separation step and secondly to the enzymatic inactivation step, i.e. in case of cold extraction, the step of adjusting the heating speed provides setting a higher heating speed v1, whereas if the product is sent firstly to the enzymatic inactivation step and secondly to the separation step, i.e. in case of hot extraction, the step of adjusting the heating speed provides setting a lower heating speed v2.

BRIEF DESCRIPTION OF THE DRAWINGS

The invention will be made clearer with the following description of an exemplary embodiment thereof, exemplifying but not limitative, with reference to the attached drawings in which.

DETAILED DESCRIPTION OF SOME EXEMPLARY EMBODIMENTS

Figure 1:
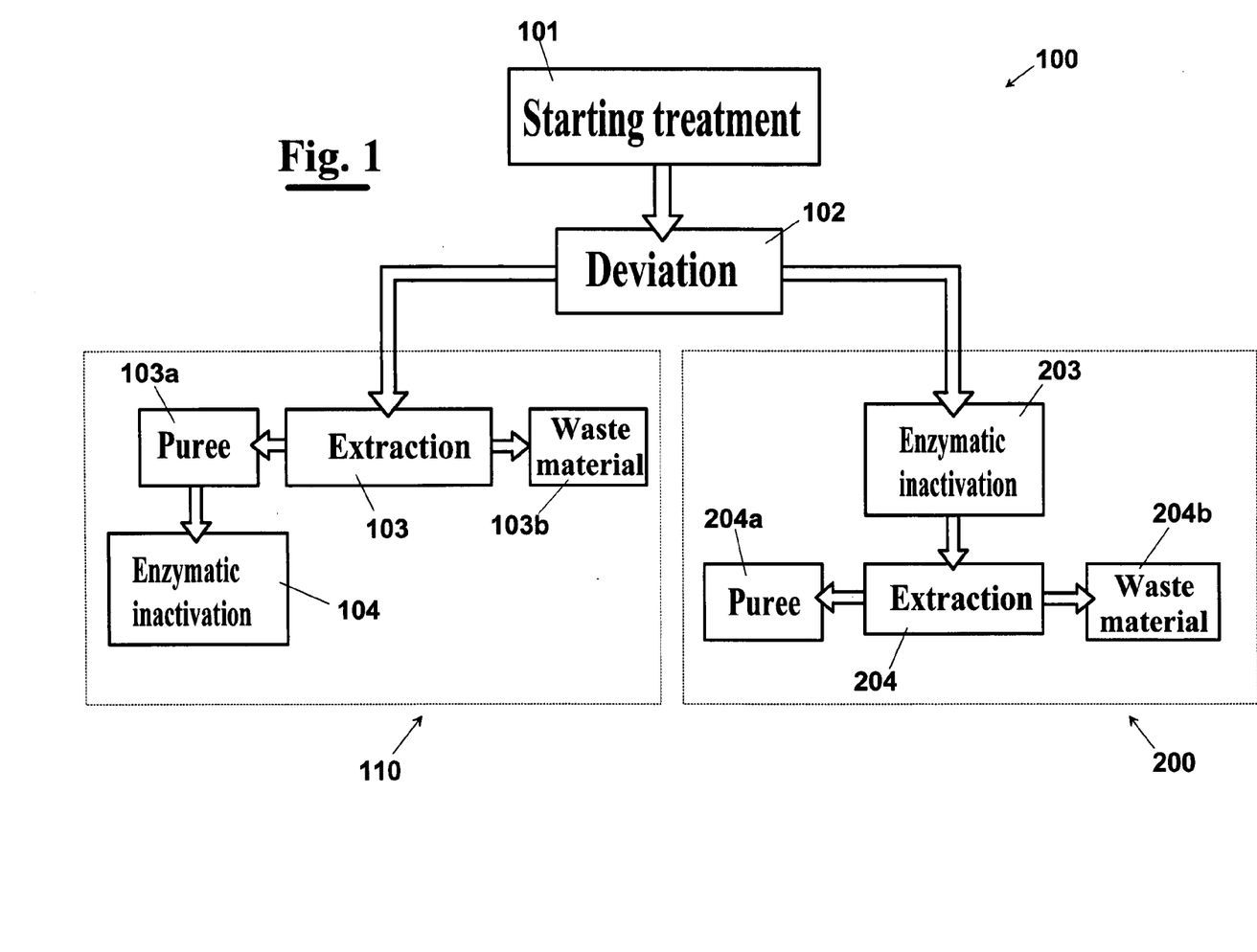
FIG. 1 shows a block diagram of the main steps of the method, according to the invention, of extraction of puree from food of nature or animal origin.

In FIG. 1 shows a block diagram 100 that depicts the main steps of the method, according to the invention, for extracting puree, or juice, from a starting product based on vegetable or animal food.

In particular, the method provides a starting treatment step, for example a softening step, of a food product of vegetable origin, such as fruit, or vegetables, obtaining a treated product, block 101.

A deviation step follows, block 102, during which the treated product is selectively directed towards a cold extraction, block 110, or towards a hot extraction, block 200.

If the treated product is directed towards a cold extraction, it follows firstly an extraction step, block 103, in which the treated product is separated into a main product comprising the puree, or the juice, block 103a and into a waste material, block 103b. The main product is then subjected to a following enzymatic inactivation step which provides quickly heating the treated product up to a determined temperature T, block 104.

In case, instead, in which the treated product is directed towards a hot extraction, it follows firstly a enzymatic inactivation step, block 203, in which the treated product is heated up to a predetermined temperature, and then it follows an extraction step, during which is split into a main product comprising the puree, or the juice, block 204a, and into a waste material, block 204b.

Figure 2:
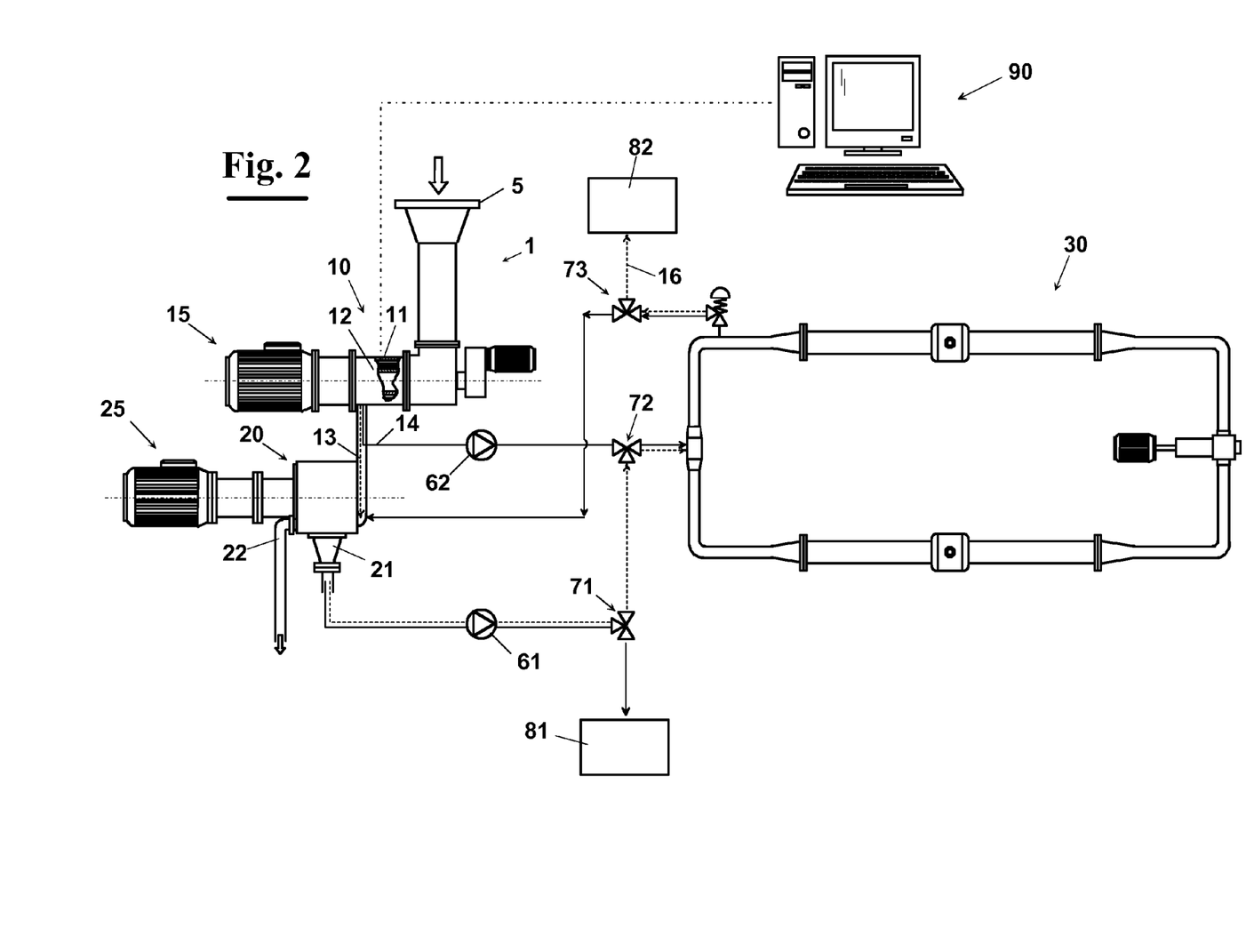
FIG. 2 diagrammatically shows an apparatus capable of carrying out the method, according to the invention, as shown in FIG. 1.

In a first exemplary embodiment of the invention, an apparatus 1 capable of carrying out the method, as above described with reference to FIG. 1, provides a treatment section 10 at which the food product to treat is fed by a hopper 5.

The treatment section can be, for example, a softening section, and comprises a rotor 11 that, operated by a motor 15, applies, in combination with a stator 12 mounted out of it, a plurality of pulses in quick succession on the starting product.

The treatment section 10 is, in particular, associated to selection means, for selectively directing the treated product towards a first discharge direction 13 (dashed line in FIG. 2), or towards a second discharge direction 14 (continuous line in FIG. 2).

In particular, along the first discharge direction 13 a extraction section 20 is arranged, in which, as well known, a rotor is mounted, not shown in the figures, which force the treated product against a fixed sieve that has a plurality of holes and is mounted outside of the rotor, in order to separate the treated product into a main product comprising the puree, or the juice, which passes through the sieve and exits through a first outlet 21, and into a waste material, which cannot pass through the sieve and is discharged via a second outlet 22. In this case, the treated product enters extraction section 20 at a temperature that is about equal to the room temperature, and therefore the extraction that is achieved is a cold extraction.

The main product at the outlet of the extraction section 20 is, then sent towards an enzymatic inactivation section 30, in which it is heated from an initial temperature $T_o$ up to an enzymatic inactivation temperature T*, about 85° C.-90° C.

The heated product is, then, withdrawn from the enzymatic inactivation section 30 and directed by a duct 16 towards a station 82 for collecting the cold extracted product.

When, instead, the treated product is directed along the second discharge direction 14, it first enters enzymatic inactivation section 30 and, once heated, is sent to the extraction section 20, which separates it into a main product, which exits through duct 21 and is sent to a station 81 for collecting the hot-extracted product, and into a waste material, which instead is discharged via the duct 22. In this case, the extraction is carried out of a previously heated product and so the apparatus works in a traditional mode.

The apparatus 1 comprises, furthermore, a plurality of devices, of valves and of ducts, that allow to switch between the "hot" to the "cold" mode, or vice-versa, easily and quickly.

Figure 3:
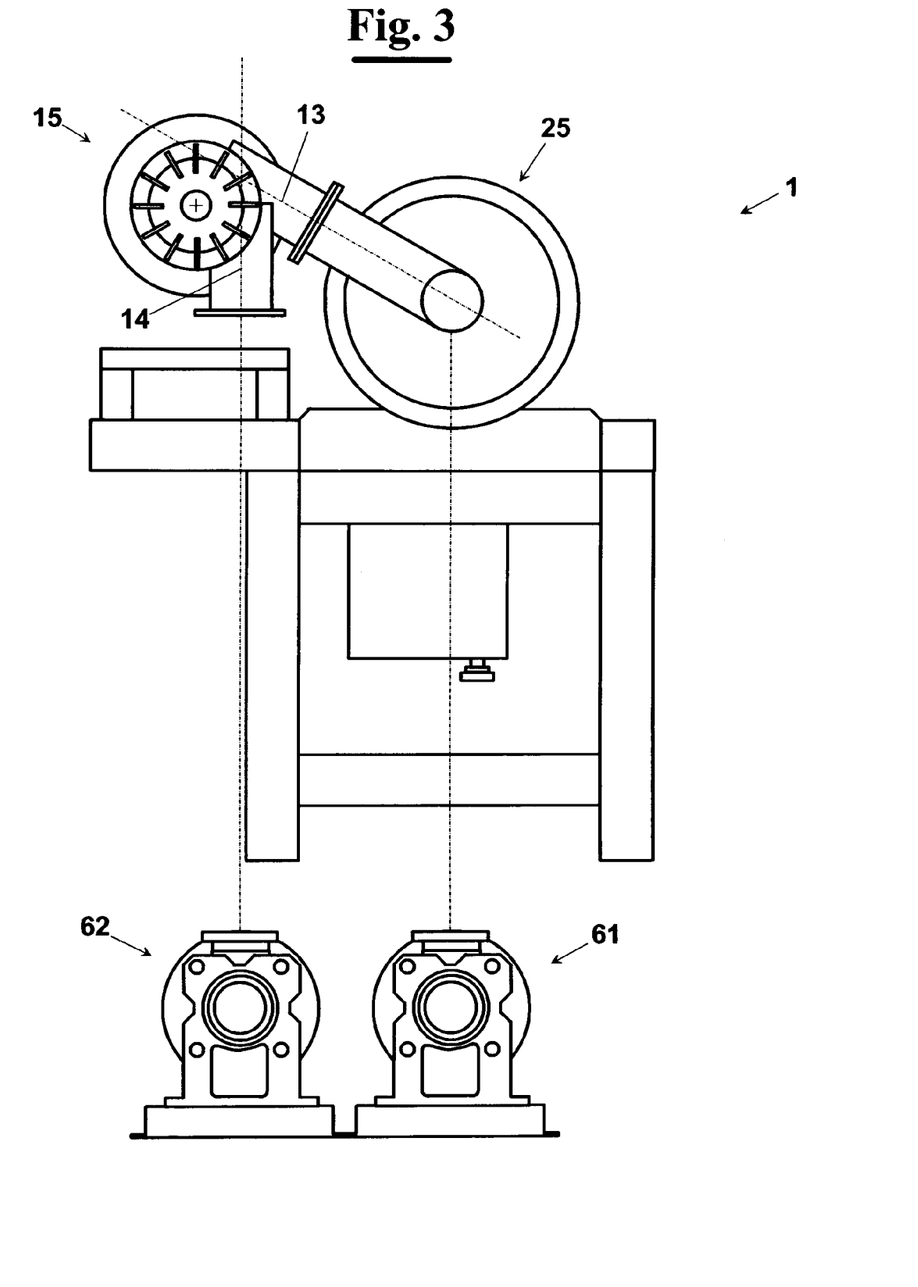
FIG. 3 diagrammatically shows an elevational front view of the apparatus of FIG. 2.

In particular, as shown in FIGS. 2 and 3, upstream of the extraction section 20 a first pump 61 is provided that works both when the apparatus 1 operates in the "hot" mode and when the apparatus 1 works in the "cold" mode. Pump 61 delivers the extracted product from the extraction section 20 towards a valve 71, for example a three-way valve. The latter, when the apparatus 1 works in a hot-extraction mode, deviates the extracted product towards station 81 for collecting the "hot" extracted product, whereas when the apparatus 1 works in a cold-extraction mode, it deviates the extracted product towards the enzymatic inactivation section 30, for example after having passed a second three-way valve 72.

Upstream of the enzymatic inactivation section 30 another valve 73 is provided, for example a three-way valve that, when the apparatus 1 works in the cold-extraction mode, deviates the heated product towards station 82 for collecting the cold-extracted product, whereas when the apparatus 1 works in hot-extraction mode it deviates the heated product towards the extraction section 20.

The circuit for conveying the product in the apparatus 1 comprises, furthermore, a pump 62 upstream of treatment section 10. Pump 62, in particular, is arranged along second direction 14 and moves the treated product from the treatment section 10 to the enzymatic inactivation section 30, after passing three-way valve 72.

Three-way solenoid valves 71, 72 and 73, pumps 61 and 62 and enzymatic inactivation section 30 are operated by a control unit 90. The latter, according to the mode that is currently operated, i.e. "cold", or "hot" mode, switches the status of the solenoid valves 71, 72 and 73, i.e. moves them in a desired deviation configuration.

Figure 4:
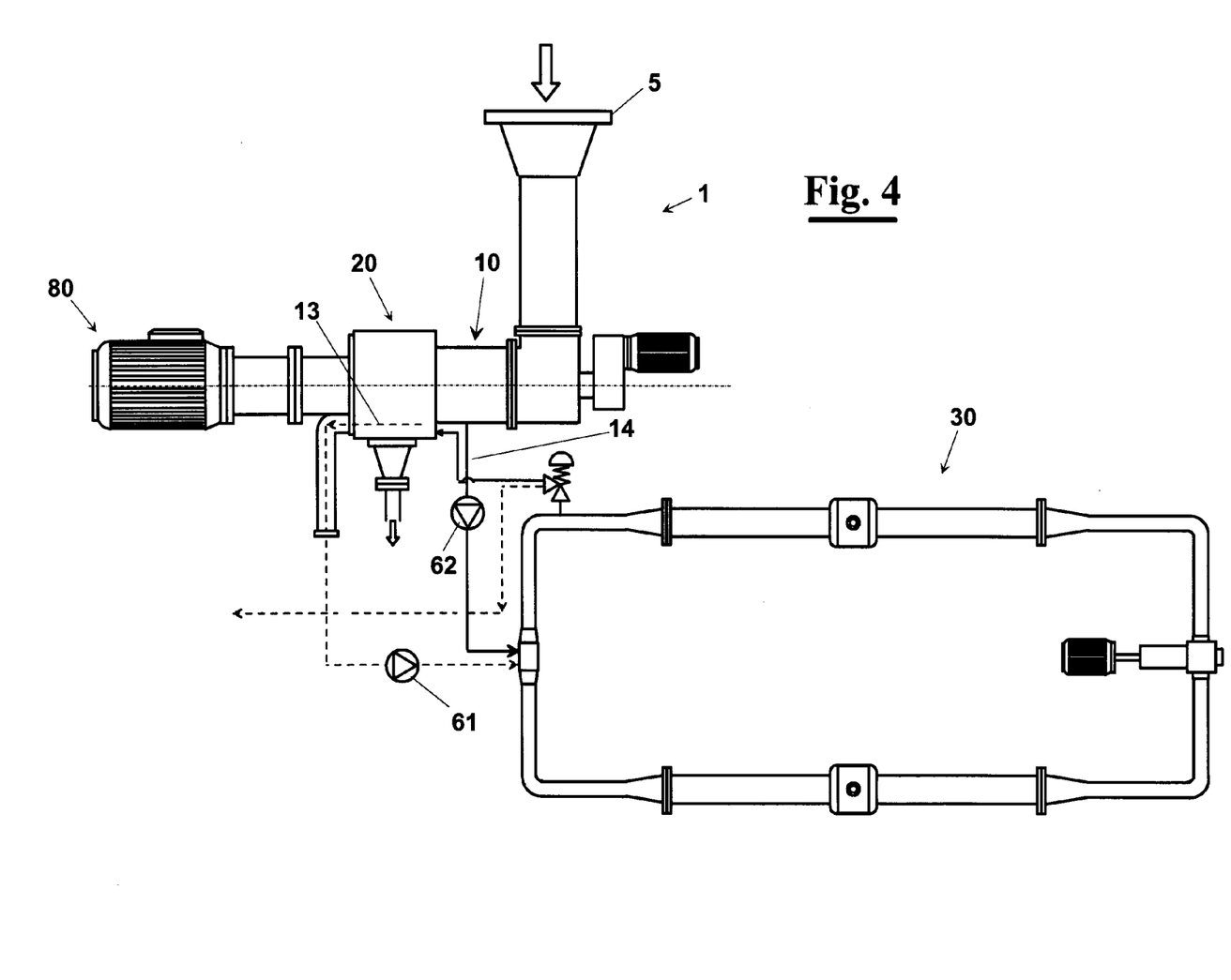
FIG. 4 diagrammatically shows an exemplary embodiment of the apparatus of FIG. 2 capable of carrying out the method, according to the invention.

In FIG. 4 an exemplary embodiment is diagrammatically shown of the apparatus 1 alternative to that described with reference to FIGS. 2 and 3.

In this case, the treatment section 20 and the extraction section 30 are arranged adjacent to each other, and the respective rotors are operated by a single motor 80. In particular, a device is provided, not shown in the figures, which directs selectively the treated product towards the first discharge direction 13, or towards the second discharge direction 14, depending on whether the apparatus 1 operates in a "cold" mode, or in a "hot" mode, respectively.

This configuration allows, in particular, to provide an apparatus 1 that is less cumbersome and to use a single motor 80 for operating both the treatment section 20 and the extraction section 30, instead of two independent motors 15 and 25, with a subsequent high energy saving.

Figure 5:
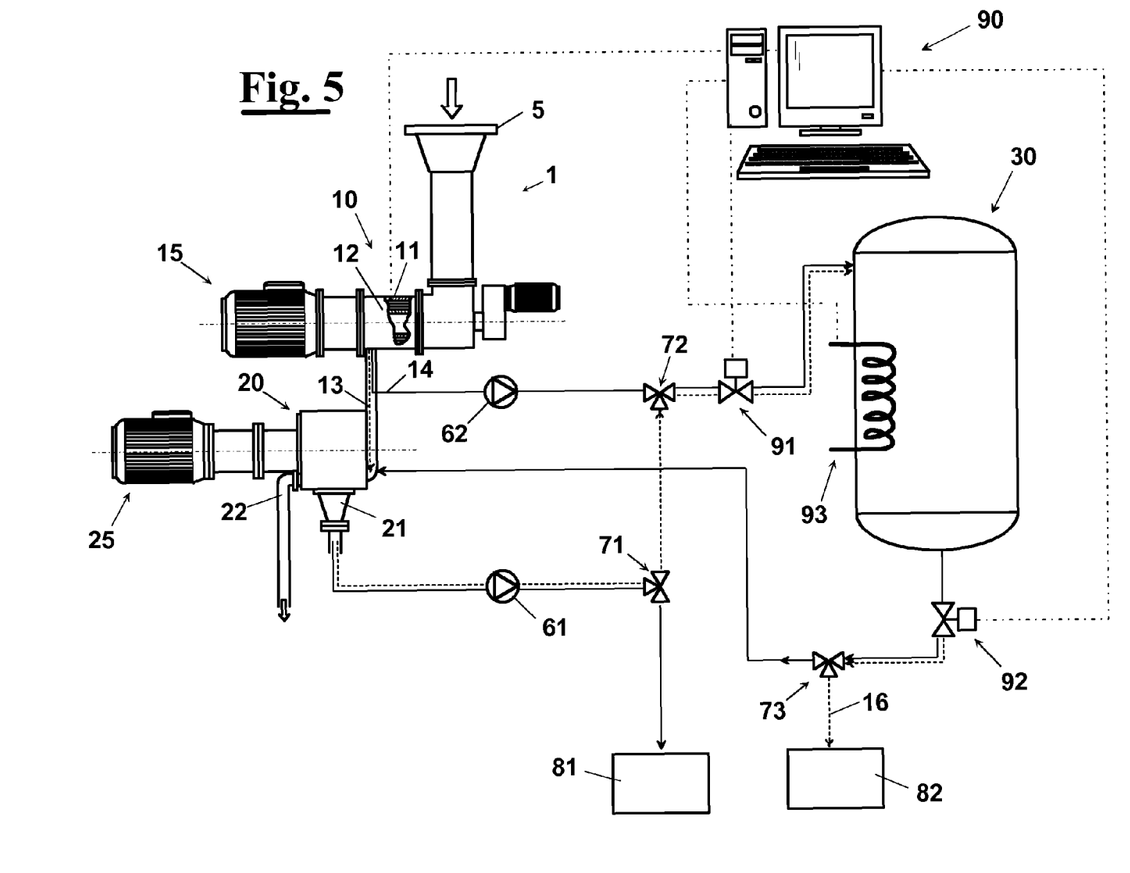
FIG. 5 diagrammatically shows a further exemplary embodiment of the apparatus of FIG. 2 capable of carrying out the method, according to the invention.

In a further exemplary embodiment, as diagrammatically shown in FIG. 5, the enzymatic inactivation section 30 comprises a heat exchanger 95 having a means for adjusting the volume (V) of treated product, for example a solenoid valve 91 for adjusting the inlet flow and a solenoid valve 92 for adjusting the outlet flow 92, as well as a means 93 for adjusting the thermal power (P) that is transferred to the treated product.

In particular, the program means 90 operate the solenoid valves 91 and 92 for adjusting the volume (V) of treated product, and operate the means 95 for adjusting the thermal power (P) transferred to the product that is contained in the heat exchanger 95. This way, the desired heating speed in the enzymatic inactivation section 30 can be set according to the type of extraction made. More precisely, in case a quick heating of the product has to be achieved, the program means sets a high thermal power P1 and at the same time a high volume V1 of the treated product. This way, the treated product is brought quickly to the enzymatic inactivation temperature. Instead, in case a slower heating of the product has to be achieved, the program means sets a thermal power P2 less than P1 and at the same time sets a volume of the treated product V2 less than V1.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Apparatus for extracting puree, or juice, from a vegetable food comprising:
   a treatment section for treating said vegetable food and obtaining a treated product;
   an extraction section in which a rotor is arranged to work in combination with a fixed sieve that has a plurality of holes, in order to separate said product of vegetable origin into a main product comprising said puree, or juice, which passes through said sieve and is discharged via a first outlet, and into a waste material which cannot pass through said sieve and is discharged via a second outlet;
   an enzymatic inactivation section comprising a heating means that is arranged to heat a product from an initial temperature up to an inactivation temperature obtaining a heated product, and to maintain said inactivation temperature for a determined time;
   wherein a selection means is provided, arranged to selectively and alternatively direct the treated product exiting from said treatment section towards a hot extraction line where the treated product passes, firstly, into the enzymatic inactivation section and, secondly, into said extraction section to form a final hot-extracted product; or
   towards a cold extraction line where the treated product passes, firstly, into said extraction section and, secondly, the main product obtained in the extraction section passes into said enzymatic inactivation section to form a final cold-extracted product;
   wherein the selection means comprises:
   a first deviation valve arranged downstream of the enzymatic inactivation section to selectively direct the heated product along a collection station of the final cold-extracted product when the treated product is directed towards the cold extraction line, or alternatively towards said extraction section when the treated product is directed towards the hot extraction line; and
   a second deviation valve arranged downstream of the extraction section to direct selectively said main product towards a station for collection of the final hot-extracted product when the treated product is directed towards the hot extraction line, or towards said enzymatic inactivation section when the treated product is directed towards the cold extraction line.

2. Apparatus, according to claim 1, wherein said selection means comprises a deviation device in said treatment section that is arranged to direct selectively said treated product along a first discharge direction, or along a second discharge direction.

3. Apparatus, according to claim 1, wherein said treatment section is selected from the group consisting of:
   a softening section;
   a grinding section;
   a shredding section;
   a sieving section;
   a cutting section; and
   a combination thereof.

4. Apparatus, according to claim 2, wherein said extraction section is arranged along said first discharge direction, whereas said enzymatic inactivation section is arranged along said second discharge direction.

5. Apparatus, according to claim 2, wherein said deviation device in said treatment section and said enzymatic inactivation section are connected to each other by a first transfer means that is arranged to collect the treated product from said treatment section and to transfer it towards said enzymatic inactivation section.

6. Apparatus, according to claim 1, wherein a program means is provided that is arranged to adjust the product heating speed in said enzymatic inactivation section, in particular said program means setting a higher heating speed in case of cold extraction, and a lower heating speed in case of hot extraction.

7. Apparatus, according to claim 6, wherein said enzymatic inactivation section comprises:
   a means for adjusting the thermal power transferred to the product;
   a means for adjusting the volume of the treated product;
   wherein said program means controls said means for adjusting the thermal power and said means for adjusting the volume of the treated product, in order to achieve a predetermined heating speed.

8. Apparatus, according to claim 6, where in case of a cold extraction, said program means sets a heating power P1 in a portion of duct of determined length L1, whereas in case of a hot extraction, said program means sets a heating power P2, with P2<P1 in said portion of duct of determined length L1.

9. Method for extracting puree, or juice, from vegetable food comprising the steps of:
   treating said vegetable food, obtaining a treated product;
   separating said product of vegetable or animal origin into a main product comprising said puree, or juice, and into a waste material in a separation step, said separation being made through a rotor that works in combination with a fixed sieve that has a plurality of holes, said main product passing through said holes and being discharged via a first outlet, said waste material not passing through said sieve and being discharged via a second outlet;
   inactivating a starting product by a heating means that heats said starting product from an initial temperature up to an inactivation temperature and maintaining said inactivation temperature for a determined time in an enzymatic inactivation step;
   wherein a step is provided of selecting a direction of said treated product, among a first direction in which the treated product is directed towards a hot extraction line to obtain a final hot-extracted product where the treated product is subjected, firstly, to said enzymatic inactivation step and, secondly, to said separation step, said starting product being coincident, in this case, with said treated product and said separation being a hot extraction, or, alternatively,
   a second direction in which the treated product is directed towards a cold extraction line to obtain a final cold-extracted product where the treated product is subjected, firstly, to said separation step and, secondly, to said enzymatic inactivation step, said starting product being coincident, in this case, with said main product and said separation being a cold extraction;

wherein the selecting step is carried out using:

a first deviation valve arranged downstream of the enzymatic inactivation step to selectively direct a heated product along a collection station of the final cold-extracted product when the treated product is directed towards the cold extraction line, or alternatively towards said separation step when the treated product is directed towards the hot extraction line; and a second deviation valve arranged downstream of the separation step to direct selectively said main product towards a station for collection of the final hot-extracted product when the treated product is directed towards the hot extraction line, or towards said enzymatic inactivation step when the treated product is directed towards the cold extraction line.

10. Method, according to claim 9, wherein said step of selecting is carried out using a selection means that is arranged downstream of said treating step.

11. Method, according to claim 9, wherein said treating step is selected from the group consisting of:
a softening step;
a grinding step;
a shredding step;
a sieving step;
a cutting step; and
a combination thereof.

12. Method, according to claim 9, wherein during said enzymatic inactivation step, the heating of said starting product is caused at a determined heating speed, and comprises the further steps of adjusting said heating speed.

13. Method, according to claim 12, wherein, if said product is sent to the cold extraction line where the product is, firstly, subjected to the separation step and, secondly, to said enzymatic inactivation step, said step of adjusting said heating speed provides setting a higher heating speed v1, whereas if the product is sent to the hot extraction line where the product is subjected, firstly, to said enzymatic inactivation step and then to said separation step, said step of adjusting said heating speed provides setting a lower heating speed v2.

* * * * *